(12) United States Patent
Wegelin

(10) Patent No.: US 8,528,790 B2
(45) Date of Patent: Sep. 10, 2013

(54) DISPENSING SYSTEM WITH MAGNET AND COIL FOR POWER GENERATION

(75) Inventor: Jackson W. Wegelin, Stow, OH (US)

(73) Assignee: Joseph S. Kanfer, Richfield, OH (US)

( * ) Notice: Subject to any disclaimer, the term of this patent is extended or adjusted under 35 U.S.C. 154(b) by 1368 days.

(21) Appl. No.: 11/999,538

(22) Filed: Dec. 6, 2007

(65) Prior Publication Data

US 2009/0145925 A1   Jun. 11, 2009

(51) Int. Cl.
*B65D 88/54* (2006.01)

(52) U.S. Cl.
USPC ........... 222/192; 222/36; 222/113; 222/321.1

(58) Field of Classification Search
USPC ............ 222/23, 36–38, 113, 192, 320, 321.1, 222/321.7–321.9, 372, 381–385; 340/10.1, 340/10.34; 307/151
See application file for complete search history.

(56) References Cited

U.S. PATENT DOCUMENTS

| | | | | |
|---|---|---|---|---|
| 4,213,544 | A * | 7/1980 | Pandolfi | 222/250 |
| 4,685,047 | A | 8/1987 | Phillips, Sr. | |
| 5,062,547 | A * | 11/1991 | Zahner et al. | 222/144.5 |
| 5,482,030 | A | 1/1996 | Klein | 128/116 |
| 5,622,163 | A * | 4/1997 | Jewett et al. | 128/200.23 |
| 2006/0144244 | A1* | 7/2006 | Girard et al. | 99/295 |
| 2007/0005021 | A1* | 1/2007 | Kohlbrenner et al. | 604/208 |
| 2007/0272764 | A1 | 11/2007 | Poulard | |
| 2008/0149663 | A1* | 6/2008 | Joyce et al. | 222/1 |
| 2008/0173705 | A1* | 7/2008 | Girard et al. | 235/375 |
| 2008/0210702 | A1 | 9/2008 | Lochinger et al. | |
| 2008/0280275 | A1 | 11/2008 | Collopy | 434/222 |

FOREIGN PATENT DOCUMENTS

| | | |
|---|---|---|
| CN | 2728631 Y | 9/2005 |
| DE | 10103890 A1 | 8/2002 |
| DE | 20 2006 011 208 U1 | 12/2006 |
| EP | 0 775 499 A2 | 5/1997 |
| JP | 2004-167458 A | 6/2004 |
| WO | 9529106 | 11/1995 |
| WO | 2007019104 A2 | 2/2007 |
| WO | WO2008/0749401 A1 | 7/2008 |

OTHER PUBLICATIONS

International Search Report for PCT/US2008/013388 dated Feb. 25, 2009, citing the relevance of the above-identified documents.
European Search Report dated Oct. 8, 2012, cited in corresponding EP Patent Application No. EP 10 15 6653.

* cited by examiner

*Primary Examiner* — J. Casimer Jacyna
(74) *Attorney, Agent, or Firm* — Renner, Kenner, Greive, Bobak, Taylor & Weber

(57) ABSTRACT

A dispensing system is presented for providing power generation from the actuation that occurs to provide product. The dispensing mechanism includes a plunger and magnet. The magnet is secured to the dispensing mechanism so that it moves with the plunger. Surrounding the dispensing mechanism is a housing that includes a coil. The coil is positioned such that as the pump is actuated, the magnet moves relative to the coil, generating power to the coil. The generated power that is produced can be applied to electronic devices that include, but are not limited to, light-emitting diodes and controllers.

12 Claims, 2 Drawing Sheets

DISPENSING SYSTEM WITH MAGNET AND COIL FOR POWER GENERATION

TECHNICAL FIELD

The invention relates to the field of self-powering mechanisms in dispensers. More particularly, the invention relates to the application of electromagnetic energy generated from the motion of a dispense actuation to various mechanisms within the dispenser. More specifically, the invention relates to employing a magnet in association with a coil to power an electronic mechanism without the need for any additional power source.

BACKGROUND

Self powering devices in dispensers are not commonly known. Often, solar cells, batteries, and/or AC power is employed as a means for powering various components within a dispenser. In more basic dispensers, hand pumps are actuated by a plunger being depressed. Indeed, all of these dispensers provide a source of mechanical motion whereby an actuator moves to allow for product to be dispensed.

Often, the dispenser includes an electronic switch in association with the actuator in order to count the number of dispenses. The switch may also trigger an indication that the dispenser is in operation. The switch associated with an actuator will either complete or break an electronic circuit upon activation in order to count or generate an indication.

One such switch known to work in association with an actuator for a dispenser is a mechanical switch that increments a counter. While these switches are operative, they are somewhat impractical due to their size, which limits the positioning required such that the user can read and reset the counter.

Prior art dispensers do not generate power from the mechanical movement necessary for dispensing of product. While prior art dispensers utilize a wide range of devices to enable signals and counters, these devices do not harness the mechanical motion of the actuator to generate power for other components.

It is also known that dispensers generate power through the use of solar cells and, while solar cells are widely employed in the art, solar cells require light to generate power and, when insufficient light is available, the supported systems are subject to failure. It would be beneficial to provide an alternative to the current power methods employed in the art of dispensing and utilize the motion of the dispensing activity itself to generate power that could be supplied to other mechanisms of the dispenser.

There is a need in the art for a dispenser that does not require a power source or mechanical switch to increment a counter and to record the data to a memory source that can be read at a later time through use of an outside mateable connection device.

SUMMARY OF THE INVENTION

In light of the foregoing, it is a first aspect of the present invention to provide a dispensing system with a magnet and coil that interact with the actuation of a pump, resulting in the generation of power.

It is another aspect of the present invention to provide a dispensing system that can power an electronic device by pump activation, without the use of a battery, solar cell, or external power.

Yet another aspect of the present invention is to provide a dispensing system that produces power from a magnet and coil interaction caused by pump actuation, which is sent to a controller for counting the number of dispenses.

Yet another aspect of the present invention is to provide a dispensing system that produces power from a magnet and coil interaction caused by pump actuation, which is sent to a light-emitting diode (LED).

Still another aspect of the present invention is to provide a dispensing system that has a controller that receives power supplied from a coil associated with a magnet, whereby the magnet and coil generate power from the motion generated by the pump, such that the controller can index its count of dispenses and be read at a later time by another controller

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
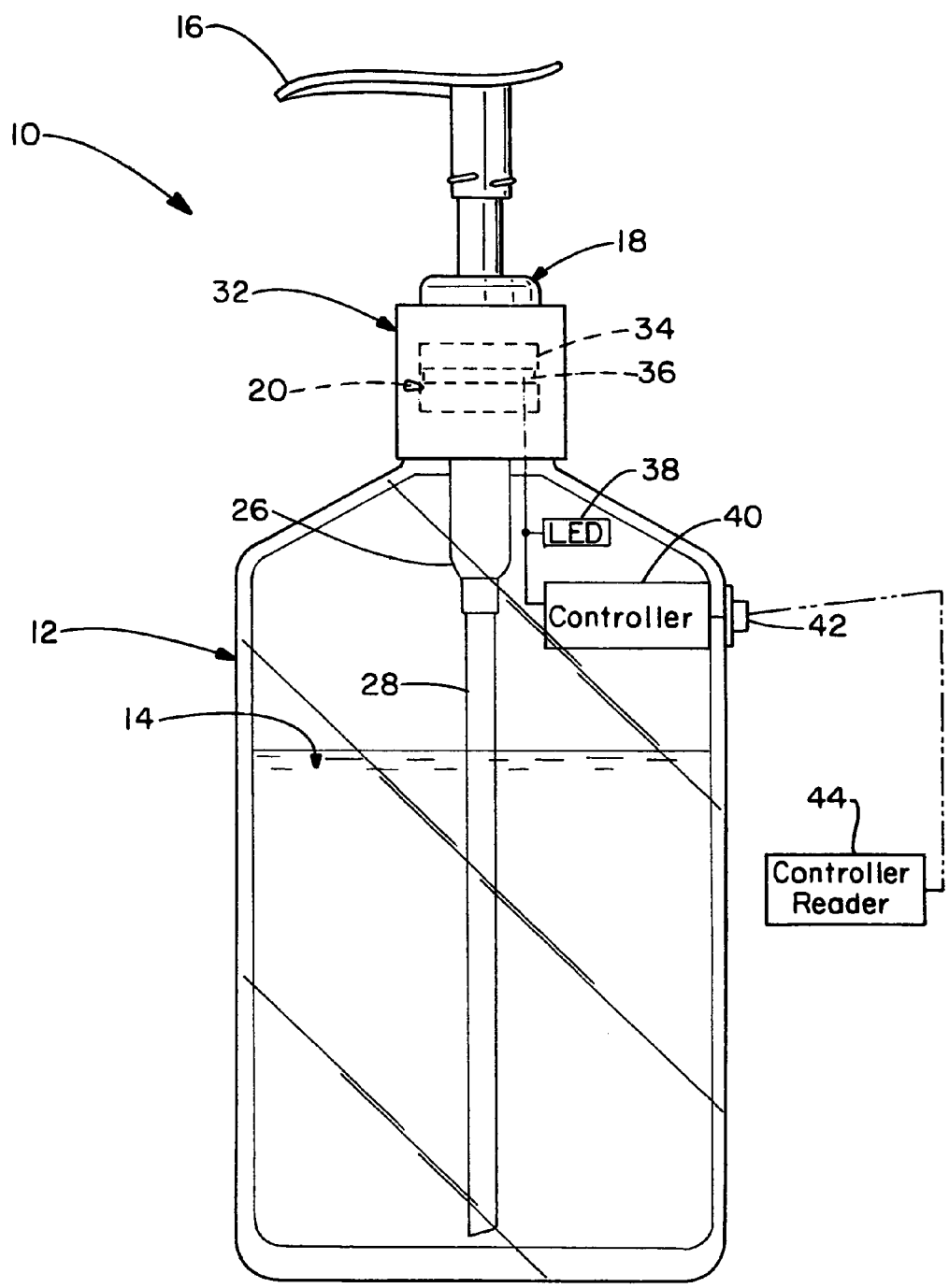
FIG. 1 is side elevational view of a dispensing system in accordance with the concepts of the present invention.

Referring now to the drawings and more particularly to FIG. 1, it can be seen that a dispensing system made in accordance with the invention is designated generally by the numeral 10. While the concept and structure of the invention is applicable to a wide variety of dispensers, it is particularly adaptable to portable dispensers as presented herein. The portable dispenser 10 includes a dispenser housing structure of widely known dispensers, designated generally by the numeral 12. The dispenser housing 12 may be a wall or counter-mount unit, or can be a freestanding unit disposed on a counter top or the like. The dispenser described herein is used for dispensing fluids such as soaps and other liquids, but it will be appreciated that other products could be dispensed such as paper, tablets, or any flowable material. For this embodiment, the dispenser housing 12 includes liquid product 14 positioned below and in communication with a dispensing nozzle 16, with an appropriate pump or other dispensing mechanism 18 interposed therebetween. As is well known by those skilled in the art, the dispensing mechanism 18 is configured to dispense a preset amount of liquid upon each dispensing cycle. In accordance with the invention, the dispensing mechanism 18 is controlled by an actuating mechanism 20 such as a motor, solenoid, plunger or the like.

Figure 4:
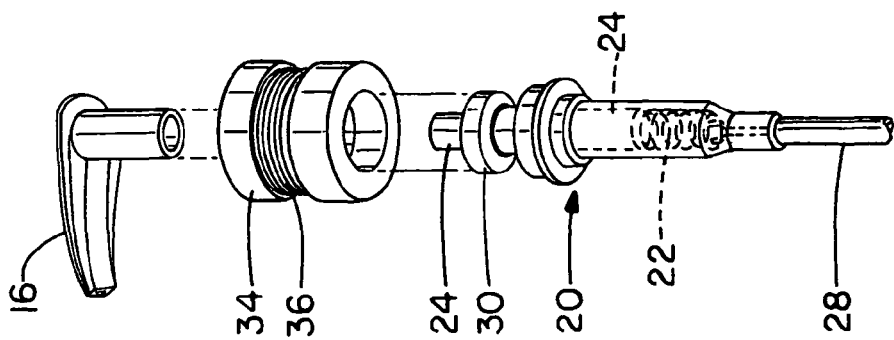
FIG. 4 is an exploded view of the dispensing mechanism of the present invention, showing the magnet and coil thereof.
Figure 3:
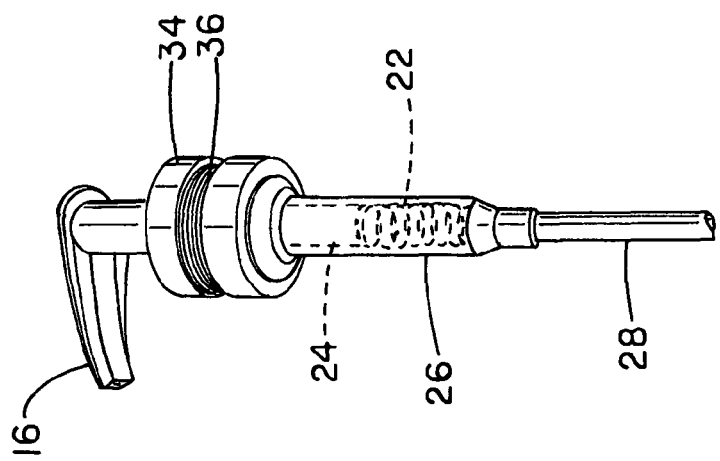
FIG. 3 is a perspective view of the dispensing mechanism of the present invention.

The mechanism 20 in the preferred embodiment contains a spring 22, plunger 24, and pump housing 26 as shown in FIGS. 3 and 4. Pump housing 26 mates to the stem 28, and receives a spring 22 and plunger 24. A ring-shaped magnet 30 secures to the outside of the plunger 24 so that the magnet 30 moves with the plunger 24. It should also be understood that the magnet 30 can be any shape and can be secured to the inside of plunger 24 or be part of the plunger 24 so long as it moves with respect to the dispensing material.

Figure 2:
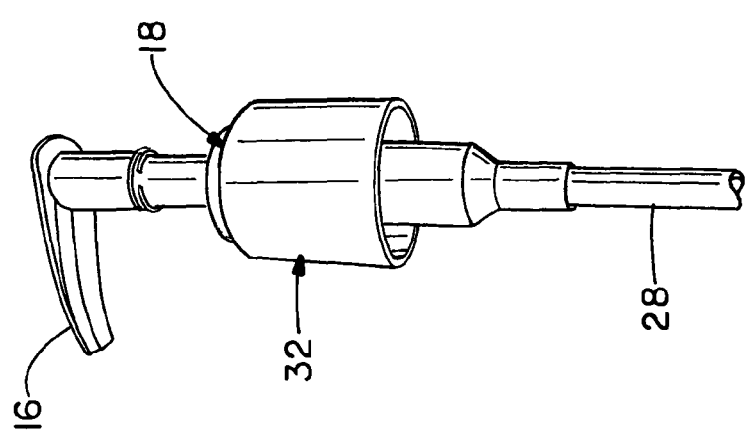
FIG. 2 is a perspective view of a prior art dispensing mechanism.

The portable dispenser 10 has a cap 32 as shown in FIGS. 1 and 2. Cap 32 secures to the dispenser housing 12, and provides geometry to cover the mechanism 20. Cap 32 is secured into position by interior threads that mate to dispenser housing 12. It should be understood that the cap 32 may secure by any means readily known in the art including a snap fit or the like. Cap 32 receives a spool 34 that includes a metal coil 36. The coil 36 is positioned such that as the pump is actuated, the magnet 30 moves relative to the coil 36, generating power to the coil 36. It should be readily apparent that the location of the coil 36 and the magnet 30 can be interchanged such that the coil 36 is included on the plunger 24, and the magnet 30 is positioned within the cap 32. The preferred embodiment is believed to generate power sufficient to momentarily power an LED 38 or other small powered electronic device such as a controller 40.

In one embodiment, the power created by the relative motion of the magnet 30 and coil 36 energizes the controller 40, which immediately increments a register in nonvolatile data storage, which can include flash, eeprom or the like to record the dispensing event. The controller 40 is preferably a microcontroller that provides the necessary hardware, software, and memory to implement the functions based on the dispensing of the portable dispenser 10. It should be understood that controller 40 may also be used for other purposes readily known in the art.

When the energy is consumed, the controller loses power, yet retains data regarding the dispensing event and continually indexes to hold a current total at any point in time. The motion of the magnet 30 continues to increment the number of dispenses in this manner. The portable dispenser 10 also includes a connector 42 in which a controller reader 44 can connect to read the number of dispenses from the controller 40 and reset the controller 40 to allow for a new count. Controller reader 44 can be any reader readily known in the art and can consist of an LED or liquid crystal display and push buttons or the like to reset controller 40.

The mechanism 20 is not limited to the device mentioned in the above and can employ any means readily known in the art. The mechanism 20 can require some means of power, but in order to conserve from its regular power source may utilize the magnet-coil interaction as taught by the present application.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A dispenser for dispensing a product, comprising:
a dispensing mechanism having a manually actuated plunger configured to transfer the product therethrough when actuated;
a coil carried by said dispensing mechanism;
a ring-shaped magnet disposed about and carried by said plunger, said magnet configured to be received within said coil; and
an electronic device coupled to said coil;
wherein as said plunger is actuated, said magnet is moved within said coil to generate power at said coil that is applied to said electronic device.

2. The dispenser according to claim 1 wherein said dispensing mechanism is a pump.

3. The dispenser according to claim 1, wherein said electronic device is a controller.

4. The dispenser according to claim 3, wherein said controller comprises a counter that increments and stores a count representative of a power generation action to a nonvolatile memory within said controller.

5. The dispenser according to claim 4, further comprising a connector associated with said controller, wherein a second controller can mate to said connector and read and reset data of said controller.

6. The dispenser according to claim 1, wherein said electronic device is a light emitting diode.

7. The dispenser according to claim 1, wherein one of said coil and magnet is fixed, and the other is movable with respect thereto.

8. The dispenser according to claim 3, wherein said controller increments a register.

9. The dispenser according to claim 8, further comprising an electrical connector associated with said controller.

10. The dispenser according to claim 9, wherein a microcontroller reader connects to said electrical connector to read said register.

11. The dispenser according to claim 10, wherein said microcontroller reader resets said register.

12. The dispenser of claim 8, wherein said register comprises nonvolatile data storage.

* * * * *